United States Patent
Isayan

(10) Patent No.: US 9,290,155 B1
(45) Date of Patent: Mar. 22, 2016

(54) WINDSHIELD WIPER BLADE COVER

(71) Applicant: Andrey Isayan, Burbank, CA (US)

(72) Inventor: Andrey Isayan, Burbank, CA (US)

( * ) Notice: Subject to any disclaimer, the term of this patent is extended or adjusted under 35 U.S.C. 154(b) by 0 days.

(21) Appl. No.: 14/622,747

(22) Filed: Feb. 13, 2015

(51) Int. Cl.
*B60S 1/04* (2006.01)
*B60R 13/04* (2006.01)
*B60S 1/38* (2006.01)
*B60S 1/58* (2006.01)
*B60R 11/00* (2006.01)

(52) U.S. Cl.
CPC ............ *B60S 1/0491* (2013.01); *B60S 1/0455* (2013.01); *B60R 13/04* (2013.01); *B60R 2011/004* (2013.01); *B60S 1/0405* (2013.01); *B60S 1/0469* (2013.01); *B60S 1/583* (2013.01); *B60S 2001/3843* (2013.01)

(58) Field of Classification Search
CPC ...... B60S 1/583; B60S 1/0469; B60S 1/0405; B60S 1/0402; B60S 1/0455; B60S 2001/3843; B65D 2585/6884; B60R 2011/004; B60R 13/04
USPC ............ 15/250.16, 250.19, 250.001, 257.01; 296/96.17, 96.15
See application file for complete search history.

(56) References Cited

U.S. PATENT DOCUMENTS 5,675,861 A * 10/1997 Ayers ................. 15/250.19
5,771,526 A * 6/1998 Burton .................. 15/250.19

FOREIGN PATENT DOCUMENTS

| DE | 19547197 A1 * | 4/1996 |
| DE | 102004039715 B4 * | 6/2006 |
| FR | 2816269 * | 5/2002 |
| GB | 721465 * | 1/1955 |
| WO | WO2014/145324 A9 * | 9/2014 |

* cited by examiner

Primary Examiner — Gary Graham
(74) Attorney, Agent, or Firm — Omni Legal Group; Omid E. Khalifeh

(57) ABSTRACT

A protective cover for a windshield wiper blade is provided. The cover may be secured on a windshield, or windscreen, in line with any windshield wipers adapted for use on a motor vehicle such as an automobile, watercraft, or even aircraft. The cover comprises a shell sized to envelop at least a blade portion of a windshield wiper when such wiper is not in use. The shell is defined, in part, by a rear flap that is hingedly engaged along a back edge of a base and releaseable from a closed position. In operation, an activated windshield wiper will automatically exit the shell to displace water and debris on the windshield by pressing the rear flap into an open position as it pivots across a windshield.

6 Claims, 4 Drawing Sheets

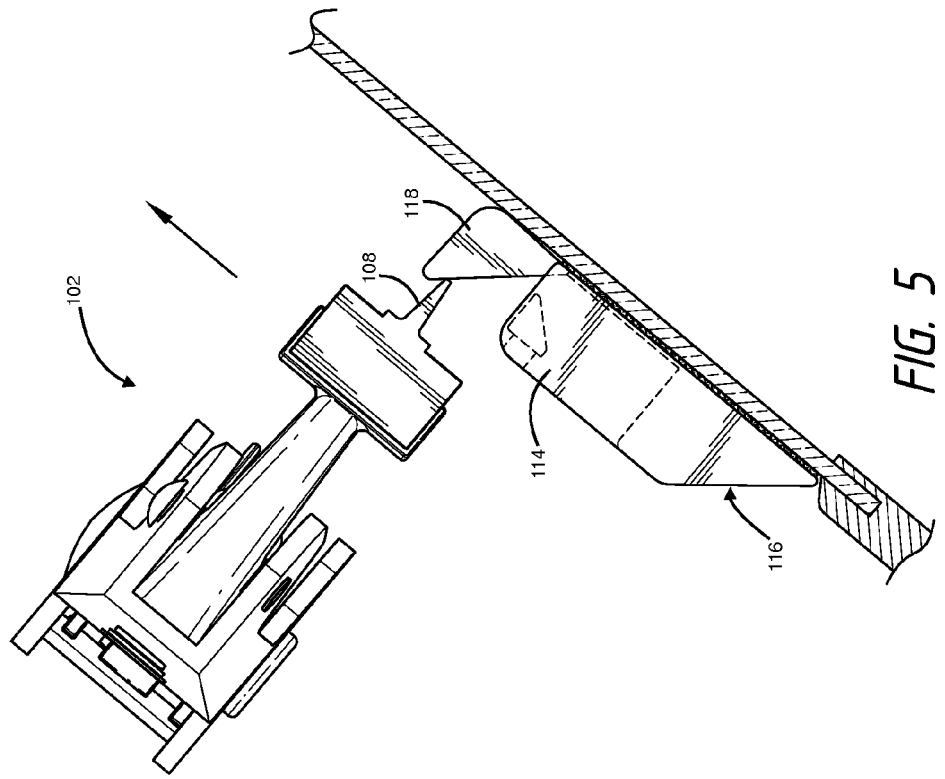
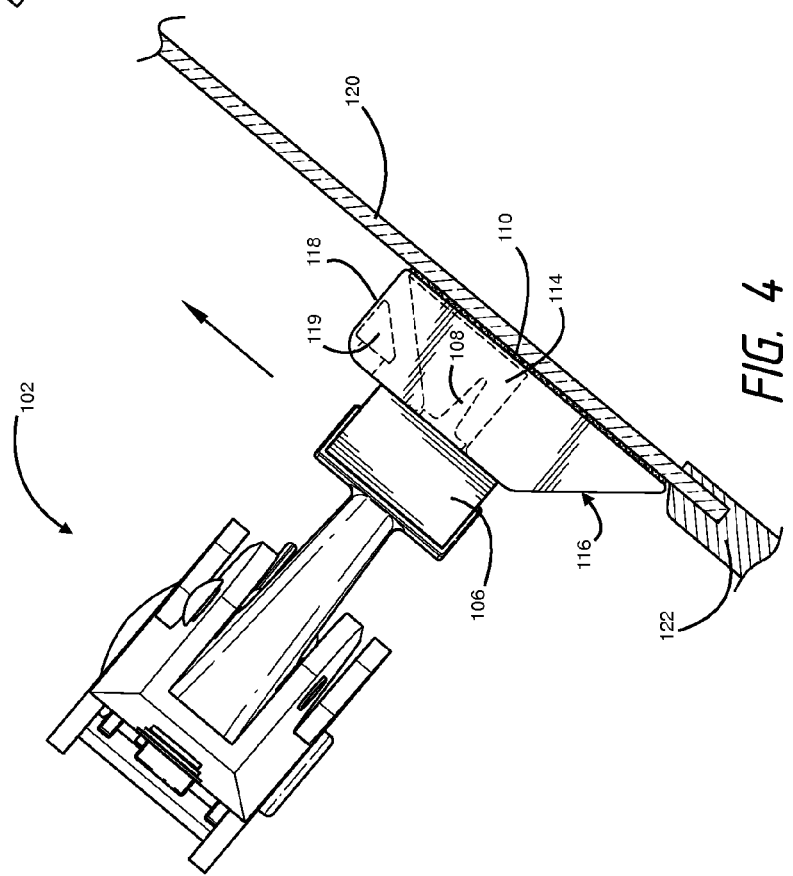

WINDSHIELD WIPER BLADE COVER

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material that is subject to copyright protection. This patent document may show and/or describe matter that is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to windshield wipers, and more particularly, to covers for protecting windshield wiper blades when such wiper blades are not in use. The disclosed subject matter further relates to a cover adapted to protect windshield wiper blades used in conjunction with various types of motor vehicles.

BACKGROUND

Windshield wipers are commonly used to wipe away rainwater, snow, ice and debris from windshields on vehicles including automobiles, trains, watercraft, and even aircraft. It is well known that blades on such windshield wipers are susceptible to degradation over time and must be replaced periodically. Indeed, because the blades usually comprise rubber compounds, exposure to heat, and the sun in particular, causes constituent oils and minerals in the blade to burn. This, in turn, causes the blade to warp, tear, and crack. Under normal operation, springs hold windshield wipers tight against the windshield so that the windshield wiper blades form a seal to displace any water, soap, and/or debris deposited thereon. When the blades become damaged, though, they leave streaks of contaminants where a seal was improperly formed and often squeal as they are pivoted across the windshield. Not only is this bothersome to a driver, but it can also be dangerous. For example, streaks and leftover debris and contaminants can impair the driver's vision. As it is, the only way to correct the problem is to periodically purchase new windshield wipers to replace the degraded ones, usually every six to twelve months.

There have been some attempts to solve these problems. Various windshield apparatuses have been proposed that shield windshield wiper blades from the sun and heat when they are not in use. For example, U.S. Pat. No. 3,199,563 to Forrest discloses a V-shaped cover that is slipped over a wiper blade, with a locking top closure to secure the blade within the cover. Additionally, U.S. Pat. No. 6,070,287 to Kornegay discloses a wiper blade assembly comprising a two-pocket cover, optionally cylindrical, which is slipped over opposite ends of the wiper blade, substantially engulfing the wiper blade assembly. U.S. Pat. No. 8,266,759 teaches a cover having a V-shaped cross sectional base body with a wiper lip, which is detatchably fixed to the wiper blade itself.

Such solutions have been deficient in a number of respects, though. For instance, each of the aforementioned patents requires a user to manually remove the covers from the windshield wiper blades prior to use. This can be particularly troublesome, and even dangerous, if there is a sudden change in the weather, such as a sudden downpour of rain. In that case, a driver would need to stop his car and remove the cover from the windshield wipers so that he can use the blades to remove rainwater from his line of sight.

Thus, there is a need for a cover that protects windshield wiper blades from damage when such blades are not in use. There is a further need for a cover from which a windshield wiper may be automatically removed, independent of a need to manually remove the cover from the blade.

SUMMARY

The present disclosure is directed to protective covers for windshield wiper blades used to wipe water and other debris from windshields, or windscreens, used on various motor vehicles.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the windshield wiper blade cover may be formed as an elongated shell that is defined, in part, by a base. In one embodiment, the base may be permanently adhered to a windshield, such as with double sided tape or even glue. In another embodiment, the base may be removeably adhered to a windshield. More particularly, the base may be adhered to the windshield in a position aligned with a resting windshield wiper. For example, many windshield wipers consist of an arm, pivotally coupled to a motor vehicle at one end, with a rubber, composite, or silicone blade attached from another end.

When not in use, the windshield wipers are known to remain still out of a driver's immediate line of sight in a resting position. In one embodiment, the resting position may be along a bottom edge of the windshield in line with a front or hood portion of a motor vehicle. In another embodiment, the resting position may be along a top, or roof, portion of the vehicle. In still another embodiment, a windshield wiper may rest along a side edge or even vertically toward a middle portion of a windshield. In even still another embodiment, any of these resting positions and configurations, and those not mentioned, may be available to windshield wipers disposed on either or both of a front windshield and rear windshield on a motor vehicle. Thus in an embodiment, the base may be adhered to the windshield in any position that may be in line with a resting windshield wiper.

The shell may be further defined by a first and a second side, the first and second sides disposed along opposite first and second edges of the base and extending upward therefrom. The shell may be even further defined by a front portion rigidly secured to the base, and a rear flap hingedly connected to a back edge of the base. The front portion and rear flap may be spaced apart by any distance that will accommodate the width of a windshield wiper blade. Of course, one skilled in the art will recognize that there are various sizes of windshield wiper blades available in the marketplace, and the size of the windshield wiper blade cover may vary to accommodate any of them.

When the cover is disposed on a windshield for use, it is contemplated that a windshield wiper blade in a resting position may be manually placed within the space between the front portion and rear flap. The rear flap may be releaseably engaged with the first and second sides so that the shell defined by the base, first and second sides, front portion, and rear flap may surround the windshield wiper blade. Thus, in an embodiment, the cover may protect the windshield wiper blade in its resting position from exposure to sunlight, heat, debris, and other possible contaminants.

As an activated windshield wiper begins to pivot across the windshield, the blade may exit the shell by pressing the rear flap to release the rear flap from its engagement with the first and second sides into an open position. Once the rear flap is open, the windshield wiper may continue to pivot across the windshield in order to remove dirt, water, and other debris typically displaced by windshield wiper blades. As the windshield wiper pivots to return to its resting position, it is contemplated that the windshield wiper will press the rear flap into its former position of releaseable engagement with the first and second sides. It is further contemplated that each of these motions may be performed independent of a need for manual intervention by a human, except insofar as said human activates the pivoting motion of the windshield wiper from controls within his motor vehicle.

Thus, it is an object of this invention to protect windshield wiper blades from exposure to heat, sunlight, and debris while the windshield wiper is not being used to displace water and debris from vehicle windshields.

It is another object of the invention to prolong the life of windshield wiper blades.

It is yet another object of this invention to ensure that the windshield wiper blade is available for use independent of a need to manually remove the windshield wiper blade cover.

One or more of the above-disclosed embodiments, in addition to certain alternatives, are provided in further detail below with reference to the attached figures. The disclosed subject matter is not, however, limited to any particular embodiment disclosed.

BRIEF DESCRIPTION OF THE DRAWINGS

FIGS. 4-7 illustrate a side view of an embodiment of the windshield wiper blade cover while the windshield wiper is in use across a windshield.

Figure 1:
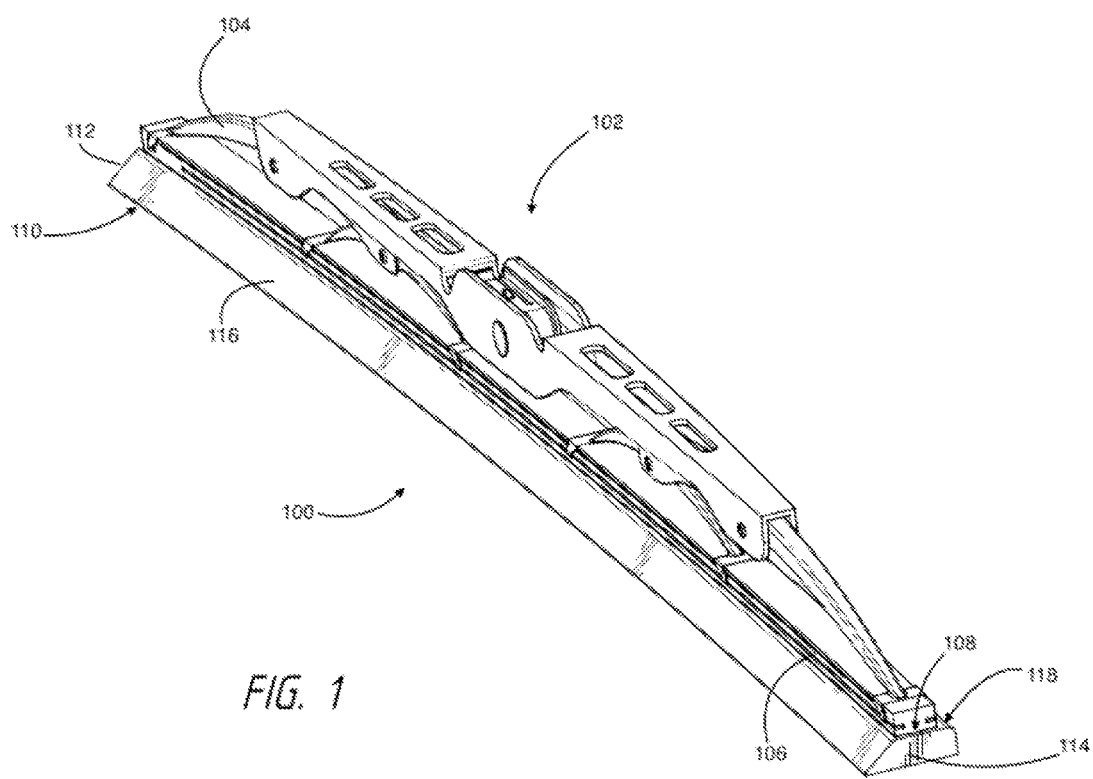
FIG. 1 illustrates a perspective view of a windshield wiper disposed in an embodiment of the windshield wiper blade cover.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

The disclosed embodiments may be better understood by referring to the figures in the attached drawings, as provided below. The attached figures are provided as non-limiting examples for providing an enabling description of the claimed apparatus. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

DETAILED DESCRIPTION

Illustrative embodiments of the invention are described below. The showings are for purposes of illustrating preferred embodiments and not for purposes of limiting the same. The following explanation provides specific details for a thorough understanding of an enabling description for these embodiments. One skilled in the art will understand that the invention may be practiced without such details. In other instances, well-known structures and functions have not been shown or described in detail to avoid unnecessarily obscuring the description of the embodiments.

An embodiment of a windshield wiper cover 100 is pictured assembled with a windshield wiper 102 in FIG. 1. The windshield wiper 102 pictured illustrates elements typical of windshield wipers at large. For example, windshield wipers may be used to clear water, rain, dirt, grime, and other debris from the windshields or windscreens of various motor vehicles. Such motor vehicles may include, for example, personal or commercial automobiles, trains, watercraft, and even aircraft. Windshield wipers generally comprise at least a spring-loaded arm 104, a blade holder 106, and a rubber composite or silicone blade 108, which is here disposed within the cover 100. It should be noted that other typical elements of windshield wipers, including, for example, a pivoting member coupled to a motor vehicle, are not included in the images for the sake of simplicity. Furthermore, although a single form of windshield wiper is shown, it will be well known to one skilled in the art that various types of windshield wipers exist and are used to wipe water and debris from various types of vehicle windshields. Thus, it should be understood that the cover 100 is not limited in application to the form of windshield wiper 102 shown, and moreover that such a windshield wiper 102 is shown only as an example of one possible windshield wiper for the sake of enabling the invention. Indeed, one skilled in the art will recognize that the placement and configuration of an embodiment of the windshield wiper cover may be adjusted to accommodate any or all of pivot type parallel, asymmetric, or pantograph-based windshield wipers. Likewise, one or more windshield wiper covers may be disposed to protect single-blade, dual-blade, or even additionally bladed configurations.

Figure 2:
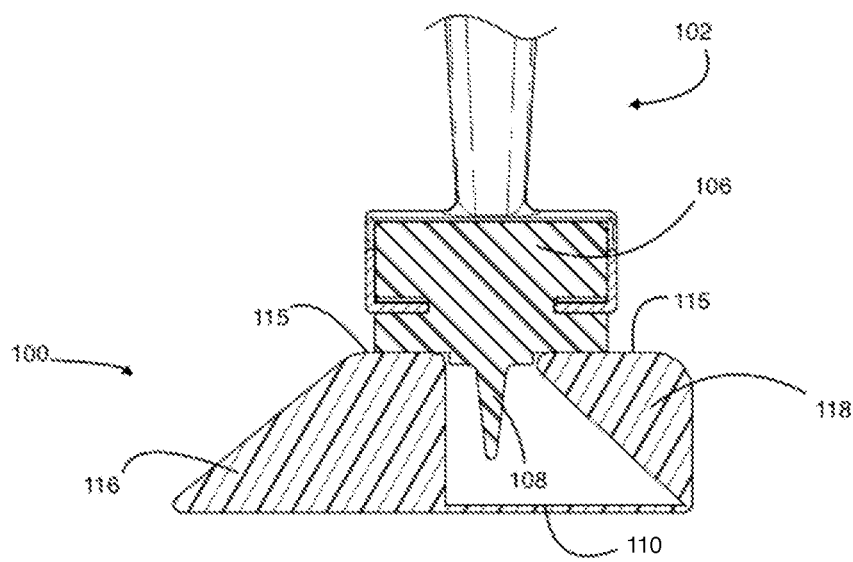
FIG. 2 shows a cross-sectional view of an embodiment of the windshield wiper blade cover in a closed position.
Figure 3:
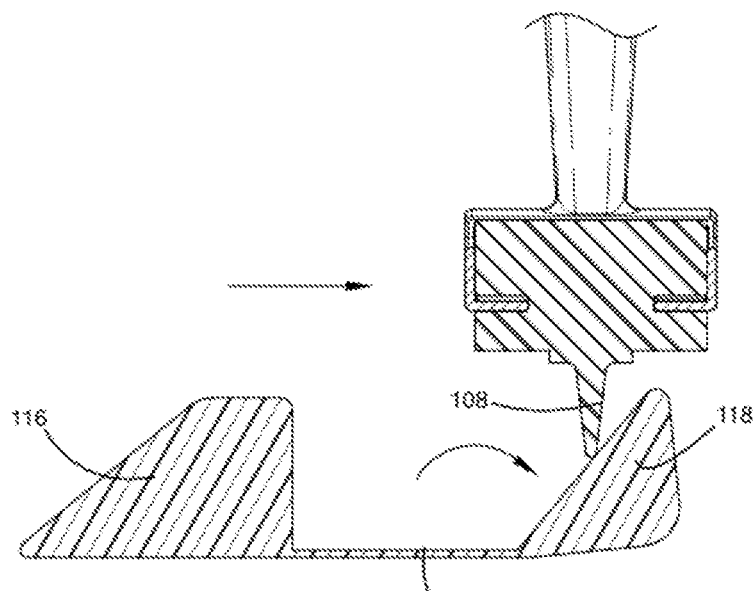
FIG. 3 shows a cross-sectional view of an embodiment of the windshield wiper blade cover in an opening position.

The cover 100 may be formed as an elongated shell defined by a base 110, a first and a second side 112, 114 disposed along opposite first and second edges of the base 110 and extending upward therefrom, a front portion 116 rigidly secured to the base, and a rear flap 118 hingedly connected to a back edge of the base 110. Such elements may be better understood with reference to FIGS. 2 and 3. In particular, FIGS. 2 and 3 provide close up, cross-sectional views of an embodiment of the windshield wiper blade 108 disposed within the windshield cover 100. It may be noted that the cross-section is taken parallel to the first and second sides 112, 114 illustrated in FIG. 1, thus first and second sides are not shown in FIGS. 2 and 3.

The front portion 116 and rear flap 118 may be spaced apart by any distance that will accommodate the width of a windshield wiper blade. Of course, one skilled in the art will recognize that there are various sizes of windshield wiper blades available in the marketplace, and the size, including length, width, and depth, of the windshield wiper blade cover 100 may vary to accommodate any of them.

In an embodiment, the front portion 116 and rear flap 118 each comprise a rest portion 115 that provides support for the blade holder 106. It is contemplated that providing support for the blade holder 106 in this manner may ensure that the blade 108 is maintained in its resting position above the base 110 so that it may be further protected from damage caused by constantly being held under pressure from a spring-loaded arm against a windshield. Additionally, providing a rest portion 115 may allow the cover 100 and windshield wiper 102 assembly to form a more complete seal around the vulnerable wiper blade 108, further protecting the wiper blade 108 from damage caused by sunlight and debris.

The cover 100 may additionally comprise water resistant as well as ultra violet (UV) resistant material compositions to further protect the wiper blade 108. For example, the cover may comprise plastic such as acrylic, UV stabilized PVC, black sheet polyethylene, polycarbonate, or combinations of the same. Many other plastics may additionally be made water resistant and/or UV stabilized by coating any optionally selected plastic with silicone, water resistant, and/or UV resistant paint to protect the cover 100 and its contents, namely the blade 108, from degradation caused by water and/or UV radiation. It is even further contemplated that UV damage may be avoided by adding pigments to the plastic composition. Of course, it should be noted that there are innumerable materials available having UV and water resistant properties which may be adaptable to comprise the windshield wiper blade cover. Those listed are merely provided by way of example, and should not be read to limit the composition of the cover.

The cross-sectional views of FIGS. 2 and 3 illustrate an embodiment of the windshield wiper cover. As demonstrated in FIG. 3, the rear flap 118 may hinge outward from a closed position as the wiper blade 108 travels away from the front portion 116.

More particularly, the rear flap 118 and front portion 116 appear as solid portions of material, which may be chosen from any of those having the characteristics described above. In an embodiment, providing solidly cast pieces of material to comprise the windshield wiper cover in this manner may improve the overall resilience and lifespan of the cover. In another embodiment, the windshield wiper cover may be formed as a thin sheet of material, again chosen from any of those having the characteristics described above. It is contemplated that such a sheet may be folded inward to define the rear flap 118, front portion 116, and hollow centers respective to each. In an embodiment, this configuration may decrease the overall weight and manufacturing cost of the windshield wiper cover.

An embodiment of the windshield wiper blade cover is shown in use in FIGS. 4-7. First, it may be seen that the cover 100 is disposed on a windshield 120 so that the front portion 116 is aligned with a hood 122, or front, portion of a vehicle such as a car. It should be noted that only a portion of the hood 122 and windshield 120 are illustrated to eliminate superfluous details and for the sake of simplicity.

In an embodiment, the base 110 may be permanently adhered to a windshield, such as with double sided tape or even glue. In another embodiment, the base 110 may be removeably adhered to a windshield. More particularly, the base 110 may be adhered to the windshield in a position aligned with a resting windshield wiper. When not in use, the windshield wiper generally remains still in a resting position out of a driver's immediate line of sight. FIGS. 4-7 illustrate a resting position that is aligned with a hood 122 or front portion of a vehicle, however, it will be known to one skilled in the art that windshield wipers are available which rest on a windshield along a top, roof, center, or even side portion of the vehicle. Thus in one embodiment, the base may be adhered to the windshield at any location on the windshield that is below the blade portion of a resting windshield wiper so that when assembled, the cover may effectively shield the blade portion of the windshield wiper from various harms addressed above. Additionally, the base 110 may be sized so that it is at least as long as the windshield wiper blade.

Thus, the windshield wiper blade cover may be disposed in any position on the windshield 120 that aligns with the particular resting position of the windshield wiper 102. It is contemplated that this positioning may be achieved for windshield wipers that pivot downward, inward, upward, or a combination of the same across a windshield. For example, windshield wipers on some vehicles are connected to the windshield in alignment with a roof portion of the vehicle so that the windshield wipers pivot downward on the windshield, rather than upward from the typical hood-side placement. It is even further contemplated that this optional positioning may be provided for windshield wipers provided on either or both of a front windshield or a rear windshield. As such, the particular configuration shown in FIGS. 4-7 is offered merely to demonstrate an embodiment of the cover in use with a windshield wiper across a windshield. Although such configuration may be considered standard on commonly used, non-commercial motor vehicles, it should not be interpreted to limit the applicability of the windshield wiper blade cover. Indeed, one skilled in the art will recognize that the cover may be secured to any portion of a windshield that aligns with its resting windshield wiper or wipers.

FIG. 4 shows an embodiment of the windshield wiper cover disposed on a windshield 120 with the wiper blade 108 in a resting position. In this resting position, the wiper blade 108 is enclosed by the base 110, first side (not visible in the side view shown), second side 114, front portion 116, and rear flap 118. Additionally, it will be seen that the blade holder 106 may rest on top of the front portion 116 and rear flap 118 to separate the wiper blade 108 from the base 110.

The windshield wiper blade 108 may be manually placed within the space between the front portion 116 and rear flap 118. The rear flap 118 may be releaseably engaged with the first side and second side 114. It is contemplated that any means for releaseably securing the rear flap 118 while the windshield wiper is in a resting position will be sufficient to practice the invention. For example, in one embodiment, the first side and second side 114 may each comprise an inward-facing protrusion 119 that operates to forcefully secure the rear flap 118 in a closed position by squeezing it. It is to be understood that an inward-facing protrusion 119 is provided as only one possible means for releasably securing the rear flap 118. For example, in another embodiment, the first and second sides may comprise inward facing latches that releaseably secure the rear flap 118 in a closed position. In still another embodiment, an inward-facing ridge may be disposed on the first and second sides to mate with an optionally hollow region of the rear flap 118 to releaseably secure the rear flap 118 in a closed position.

Enveloped in this manner, the windshield wiper blade 108 may be shielded from exposure to sunlight, heat, debris, and other contaminants known to possibly degrade any material comprising the windshield wiper blade 108.

Figure 7:
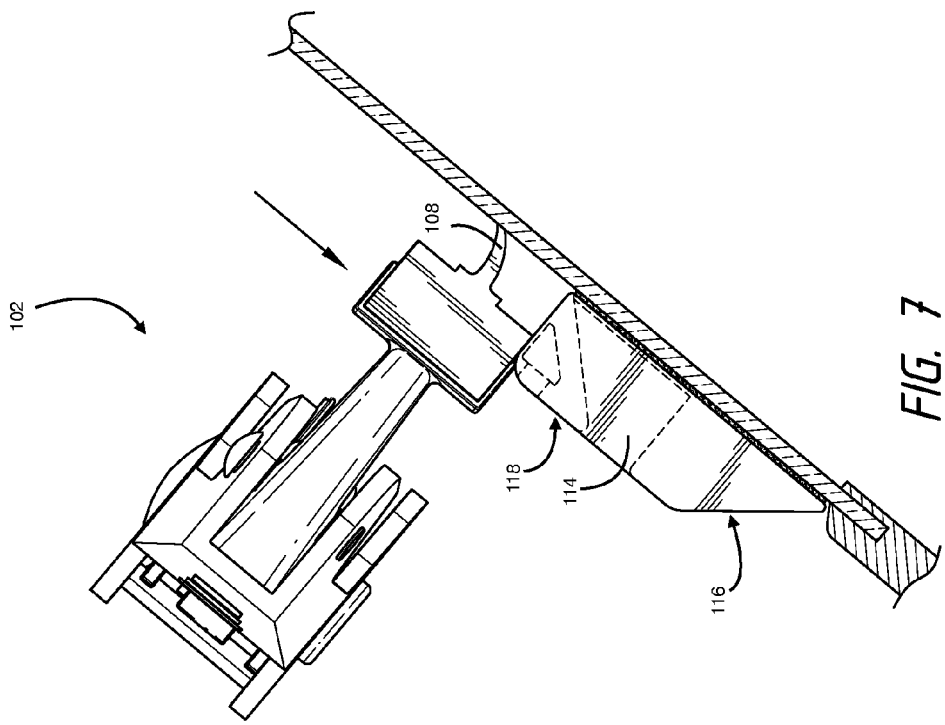
Figure 6:
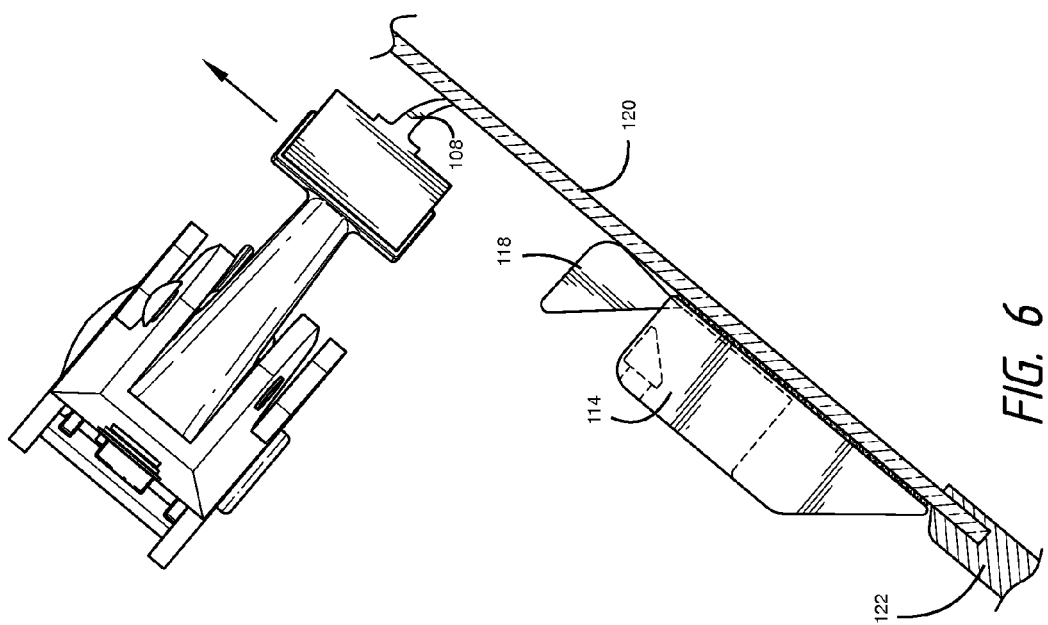

With particular attention to FIGS. 5-7, as an activated windshield wiper 102 begins to pivot across the windshield 120, in a direction away from the front portion 116 of the windshield wiper cover, the blade 108 may exit the cover by pressing the rear flap 118 into an open position, releasing the rear flap 118 from its engagement with the first side (not visible) and second side 114. Upon exiting the cover, the blade 108 may wipe across the windshield in order to remove dirt, water, and other debris typically displaced by windshield wiper blades. As the windshield wiper pivots to return to its resting position, toward the front portion 116 of the windshield wiper cover, the windshield wiper 102 may press the rear flap 118 into its former position, releaseably engaged with the first side and second side 114.

Each of these motions may be performed independent of a need for manual intervention by a human. Indeed it should be noted that the particular shape of the front portion 116 and rear flap 118 may be formed to aid automatic operation of the cover independent of any need for manual, human intervention. For example, the rear flap 118 is shown as a triangular shape. Because a leg of the triangular rear flap 118 extends upward, this may enable the windshield wiper 102 to more readily reengage the rear flap 118 with the first side and second side 114 in a closed position so that the wiper blade 108 may continue an uninterrupted, pivoting course over the windshield 120. With respect to the front portion 116, a quadrilateral is shown with an incline that braces the cover against the hood 122 or front portion of the motor vehicle, however the front portion 116 and rear flap 118 may be provided as other shapes without straying from the invention.

CONCLUSIONS, RAMIFICATIONS, AND SCOPE

While certain embodiments of the invention have been illustrated and described, various modifications are contemplated and can be made without departing from the spirit and scope of the invention. For example, the size and particular shape of the windshield wiper cover may vary depending on the type of motor vehicle on which the cover is intended for use. The windshield wiper cover may be further adapted for use with various windshield wiper designs, including for example, pivot type, pantograph-based, single blade, dual blade, or any other conceivable windshield wiper type and configuration relative to a particular windshield. Accordingly, it is intended that the invention not be limited, except as by the appended claim(s).

The teachings disclosed herein may be applied to other devices, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the cover for a windshield wiper blade with which that terminology is associated. In general, the terms used in the following claims should not be constructed to limit the windshield wiper blade cover to the specific embodiments disclosed in the specification unless the above description section explicitly defines such terms. Accordingly, the actual scope encompasses not only the disclosed embodiments, but also all equivalent ways of practicing or implementing the disclosed apparatus. The above description of embodiments of the windshield wiper blade cover is not intended to be exhaustive or limited to the precise form disclosed above or to a particular field of usage.

While specific embodiments of, and examples for, the apparatus are described above for illustrative purposes, various equivalent modifications are possible for which those skilled in the relevant art will recognize.

While certain aspects of disclosed apparatus are presented below in particular claim forms, various aspects of the apparatus are contemplated in any number of claim forms. Thus, the inventor reserves the right to add additional claims after filing the application to pursue such additional claim forms for other aspects of windshield wiper blade cover.

What is claimed is:

1. A cover for a windshield wiper assembly having at least an arm, a blade portion, and a blade holder, the cover comprising:
    an elongated shell sized to envelop at least the blade portion of the windshield wiper assembly, the shell defined by
        a base securable to a windshield,
        a first side and a second side upwardly extending from opposite first and second edges of the base,
        a rear flap disposed between the first side and second side, the rear flap hingedly attached along a back edge of the base and releaseably engageable with the first and second sides, the rear flap further configured to lie level with the base when disengaged from the first and second sides to permit the blade portion to slideably exit the cover and
        a fixed front portion disposed between the left side and right side and upwardly extending from a front edge of the base,
        wherein the front portion of the shell and rear flap define a rest portion to support the blade holder in a resting position so that the blade portion is prevented from being held under pressure against the windshield while enveloped in the shell.

2. The cover of claim 1, wherein the elongated shell comprises rugged, UV resistant material.

3. The cover of claim 1, wherein the elongated shell comprises water resistant material.

4. The cover of claim 1, wherein the rear flap is further configured to disengage from the first side and second side when the windshield wiper is activated to pivot away from the front portion so that the windshield wiper blade disposed within the shell presses against an inside of the rear flap, and wherein the rear flap is further configured to reengage with the first and second sides when the activated windshield wiper pivots toward the front portion so that the blade portion presses against an outside of the rear flap.

5. The cover of claim 1, wherein the first and second sides comprise means for releasably securing the rear flap while the blade portion enveloped therein is in a resting position.

6. The cover of claim 5, wherein the first and second sides comprise an inward-facing protrusion to releaseably engage the rear flap in a closed position by force.

* * * * *